US008162024B2

(12) United States Patent
Pierce

(10) Patent No.: US 8,162,024 B2
(45) Date of Patent: Apr. 24, 2012

(54) BOTTLE LABEL REMOVAL APPARATUS

(75) Inventor: Javin Cedric Pierce, Stowe, VT (US)

(73) Assignee: Hinckley Cellars, LLC, Waterbury Center, VT (US)

( * ) Notice: Subject to any disclaimer, the term of this patent is extended or adjusted under 35 U.S.C. 154(b) by 612 days.

(21) Appl. No.: 11/941,957

(22) Filed: Nov. 18, 2007

(65) Prior Publication Data

US 2009/0007737 A1 Jan. 8, 2009

Related U.S. Application Data

(60) Provisional application No. 60/948,478, filed on Jul. 8, 2007.

(51) Int. Cl.
*B32B 38/10* (2006.01)

(52) U.S. Cl. ........ 156/762; 156/717; 156/761; 156/921; 156/936; 83/440; 83/440.2; 83/443; 83/446; 83/456; 83/460; 83/467.1; 83/582

(58) Field of Classification Search .................. 118/504; 83/440, 440.2, 443, 446, 456, 460, 467.1, 83/582; 156/717, 761, 762, 921, 936
See application file for complete search history.

(56) References Cited

U.S. PATENT DOCUMENTS

| | | | | |
|---|---|---|---|---|
| 847,812 | A * | 3/1907 | Peterson et al. | 225/19 |
| 1,864,592 | A * | 6/1932 | Griffin et al. | 219/50 |
| 1,915,736 | A * | 6/1933 | Hurlbut | 225/19 |
| 2,516,998 | A * | 8/1950 | Kimball et al. | 15/101 |
| 4,122,734 | A * | 10/1978 | Hurst | 82/1.11 |
| 4,791,007 | A * | 12/1988 | Gleason et al. | 427/282 |
| 4,834,826 | A * | 5/1989 | Abe et al. | 156/344 |
| 4,944,832 | A * | 7/1990 | Abe et al. | 156/584 |
| 5,152,865 | A * | 10/1992 | Hurst | 156/344 |
| 5,372,672 | A * | 12/1994 | Seifert et al. | 156/584 |
| 5,651,846 | A * | 7/1997 | Hurst | 156/64 |
| 5,672,231 | A * | 9/1997 | Willkens et al. | 156/344 |
| 5,685,053 | A * | 11/1997 | Deonarine et al. | 29/426.4 |
| 5,885,401 | A * | 3/1999 | Eiban | 156/344 |
| 6,199,615 | B1 * | 3/2001 | Klarl | 156/584 |
| 7,174,599 | B2 * | 2/2007 | Stiles | 15/257.01 |
| 2004/0216579 | A1 * | 11/2004 | Zeder et al. | 83/698.11 |

* cited by examiner

*Primary Examiner* — Mark A Osele
*Assistant Examiner* — Nickolas Harm
(74) *Attorney, Agent, or Firm* — Ward and Smith, P.A.

(57) ABSTRACT

A device is provided for removal of a layer, such as a label, from a cylindrical surface of an object. The device includes a guide, a cutting instrument, and a base connecting the guide and the cutting instrument. The guide and the cutting instrument are separated by a distance defined by the base, and the cutting instrument is positioned to shave along the object's surface to remove the layer, when the surface of the object is rotated against the cutting instrument and against the guide.

15 Claims, 7 Drawing Sheets

BOTTLE LABEL REMOVAL APPARATUS

CROSS-REFERENCE TO RELATED APPLICATIONS

This application claims the benefit of, and expressly incorporates herein by reference, the entire disclosure of U.S. patent application Ser. No. 60/948,478, entitled Bottle Label Removal Apparatus and Associated Method, filed Jul. 8, 2007.

FIELD OF THE INVENTION

The present invention relates to a label removal device and method. More particularly, the present invention relates to the removal of keepsake labels from the surface of bottles and/or other cylindrical surfaces.

BACKGROUND

Wine and other labels are collected as mementos of special events, used in wine journals, tasting notes, used for decoration, collected as objects of art, and saved as a future reference for label information (e.g. vineyard, vintage, region, grape).

Sommeliers (wine stewards), wine enthusiasts, wine cellar owners, and households that enjoy wine and wine label collecting have an interest in removing (e.g., from wine bottles) labels while maintaining the condition and integrity of the label. A wine steward may want to peel and remove a label from a bottle of wine consumed by restaurant patrons, and then provide the label to the patrons as a keepsake of the occasion. A wine cellar owner may keep a "cellar book" which includes labels and tasting notes for reference of cellar inventory. Enthusiasts and oenophiles may collect labels in a wine journal to record tasting notes, food pairings and pricing/vendor information. Others may want to remove labels of a favorite wine, so they can show to a wine merchant to order more. Thus there is a need for a device and method of easily removing a label, such as that from a wine bottle, while maintaining the condition and integrity of the label.

Currently, there are known methods of keepsake bottle label removal. However, they all have substantial drawbacks with regard to ease of use and maintaining the integrity of the label. One method of label removal involves soaking a bottle in water or soapy water to loosen adhesive label backing, then manually peeling or sliding the label from bottle (by hand without an implement). Or alternatively, a standard straight blade is used to scrape and thus remove the well-soaked label from the bottle. However, over-soaking can cause labels to warp, lose integrity and degrade or deteriorate. Soaking is neither an effective nor an efficient means of removal for many types of labels, as the adhesive on many labels fail to release and/or the label tears during the manual removal process. Likewise, free-hand, manual use of a standard straight blade (razor blade) to remove labels can be tedious, hard to manage without damaging the label and even dangerous.

Another alternative but lesser-known method of wine label removal includes the use of solvents (e.g. rubber cement remover) to dissolve and/or loosen the glue or adhesive backing. Solvents can damage paper labels, and can pose a health risk when used in a manner which exceeds maximum exposure limits.

Another method of wine label removal involves the application and removal of a clear one-sided self-adhesive sheet (e.g. Wine Appeal, Label-off™). The single use sheet is designed to adhere to the label surface and tear the label from its backing upon removal, thereby separating the printed surface of the label from the label backing and adhesive. However, this method often results in torn or distressed labels and/or undesirable wrinkles in the clear adhesive laminate. Thus, it is an objective of the invention to provide a device and method of easily removing a label, such as that from a wine bottle, while maintaining the condition and integrity of the label.

SUMMARY OF THE DISCLOSURE

The present invention provides a device for removing a layer (e.g., label, veneer) along a substantially cylindrical surface of an object. The device includes a guide, a cutting instrument, and a base that connects the guide and the cutting instrument. The guide and the cutting instrument are separated by a distance that is defined by the base, wherein the cutting instrument is positioned to shave along the object's surface to remove the layer, when the substantially cylindrical surface of the object is rotated against the cutting instrument and against the guide. In one aspect of the invention the guide is substantially cylindrical in shape and is a spring form that provides spring action against the objects substantially cylindrical surface when the object is rotated with respect to the cutting instrument. The device may be a unitary structure including the guide, the base, and the cutting instrument. The cutting instrument may extend approximately perpendicularly to the base and the guide and the cutting instrument are preferably substantially parallel to one another and positioned on a same side of the base, and are at opposite ends with respect to one another. The cutting instrument preferably includes a blade, which may be removable, and may further include a blade guard and/or a safety guard.

In another embodiment the present invention provides a device for shaving along a surface of an object having a substantially cylindrical surface and a layer. The device includes a cutting instrument, a guide, and a base where the base connects the guide and the cutting instrument. In an aspect of the invention the object is received by the cutting instrument and the guide such that shaving is along the surface of the object under the layer when the object is rotated with respect to the cutting instrument. In one aspect of the invention the guide is substantially cylindrical in shape and is a spring form that provides spring action against the objects substantially cylindrical surface when the object is rotated with respect to the cutting instrument. The device may be a unitary structure including the guide, the base, and the cutting instrument. The cutting instrument may extend approximately perpendicularly to the base and the guide and the cutting instrument are preferably substantially parallel to one another and positioned on a same side of the base, and are at opposite ends with respect to one another. The cutting instrument preferably includes a blade, which may be removable, and may further include a blade guard and/or a safety guard.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION

Figure 1:
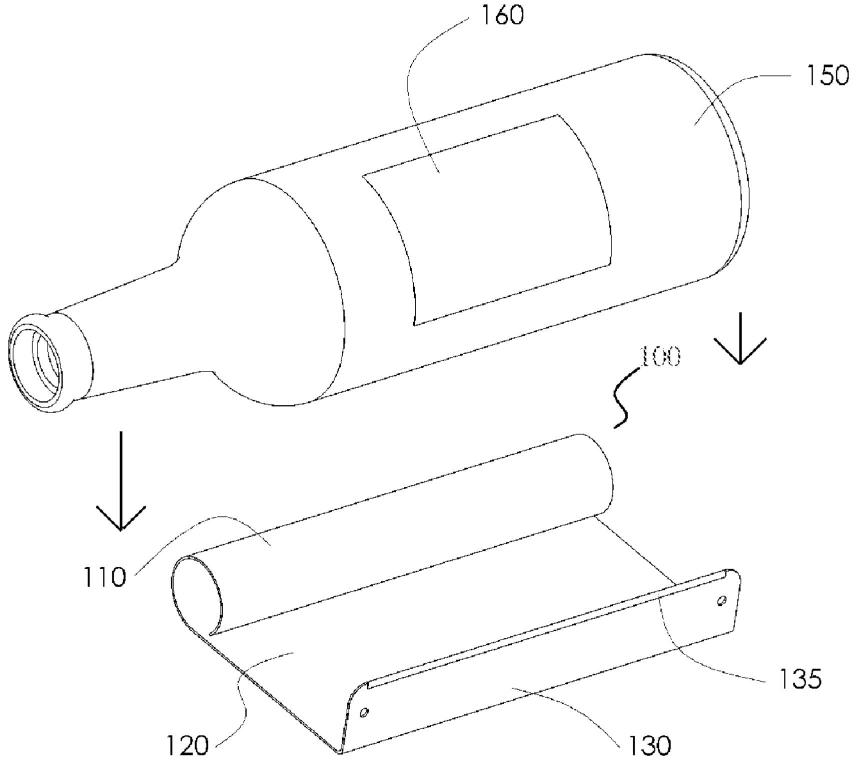
FIG. 1 is a perspective view of a device for removing a label along a cylindrical surface of an object.

FIG. 1 illustrates a device 100 for removing a layer 160, along a surface of an object 150. Device 100 includes a cutting instrument 130, a guide 110, and a base 120 wherein cutting instrument 130 and guide 110 are separated by a distance defined by base 120 and wherein base 120 connects cutting instrument 130 and guide 110. Cutting instrument 130 includes a blade 135.

Device 100 may be made of any suitable material, including but not limited to stainless steel or plastic. Layer 160 may include, but is not limited to a label (e.g., a wine bottle label) or veneer that is attached or adhered to the outer surface of object 150. Object 150 may include but is not limited to a bottle or container with a substantially cylindrical surface. Object 150 may be any number of bottles or containers having a substantially cylindrical surface, in one example object 150 includes a wine bottle. Guide 110 in one embodiment is a substantially cylindrical cylinder, such cylinder may be a fully closed cylinder or partially open. It should be appreciated that guide 110 may take the form of other geometric shapes, such as triangular or wedge shape, or any other suitable shape that facilitates the removal of layer 160 from object 150. Base 120 is substantially planer, has a top side and a bottom side and connects guide 110 and cutting instrument 130. Cutting instrument 130 is substantially perpendicular to base 120. Guide 110 and cutting instrument 130 are positioned on the top side of base 120 and at opposite ends to one another, as shown in FIG. 1. Blade 135 of cutting instrument 130 is a standard blade that would be readily understood by one of ordinary skill in the art.

Figure 2:
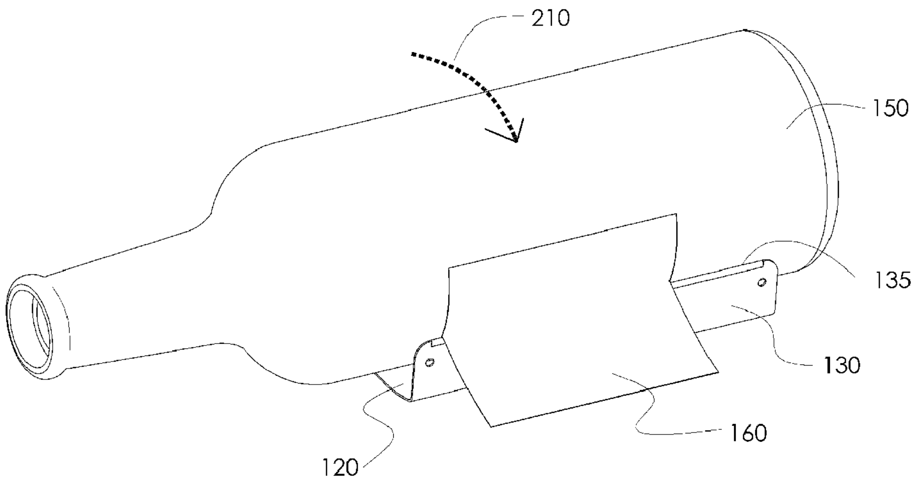
FIG. 2 is a view of a bottle having a cylindrical surface with a label being removed using a device for removing a label along a cylindrical surface of an object.
Figure 3:
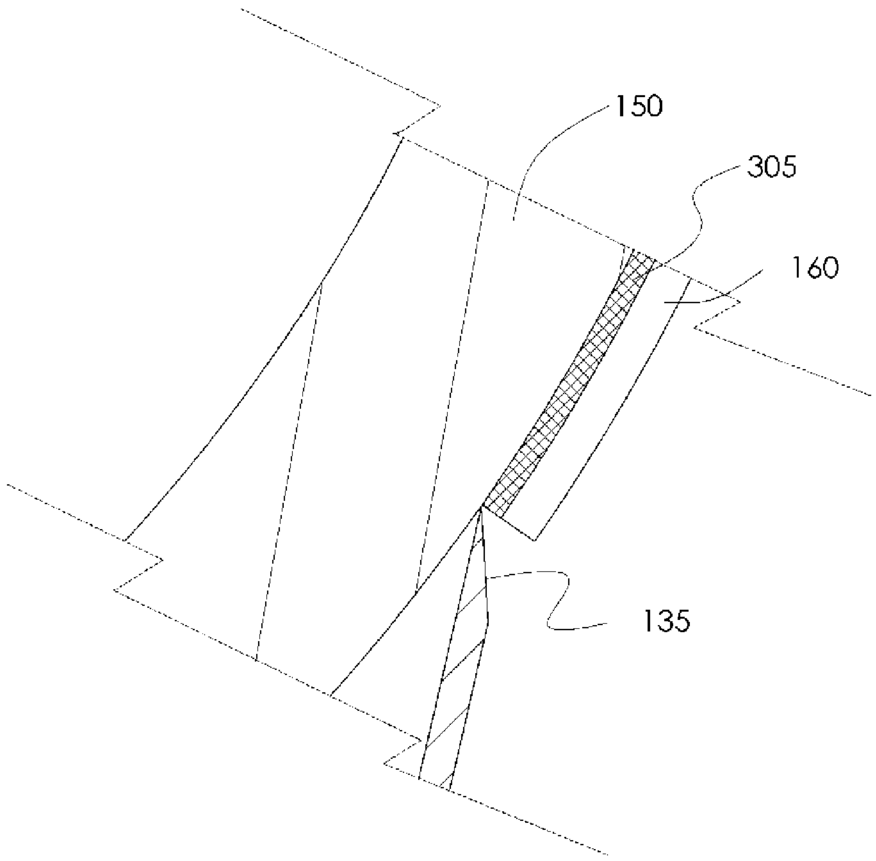
FIG. 3 is a cross sectional view of a bottle having a cylindrical surface and a label and of a device for removing a label along a cylindrical surface of an object.

FIGS. 2 and 3 illustrate device 100 in use. In use, a user positions object 150 onto device 100 such that the cylindrical surface of object 150 is in contact with guide 110 and cutting instrument 130. The user, or other mechanical mechanism, causes a force to be applied to object 150 causing object 150 to be forced against guide 110 and cutting instrument 130. As a user causes a downward force to be applied on object 150 the user simultaneously causes object 150 to be rotated in the direction of cutting instrument 130, as shown by arrow 210. As object 150 is rotated layer 160 comes in contact with blade 135 of cutting instrument 130. As illustrated in more detail in FIG. 3 blade 135 is under spring tension so that blade 135 is positioned to shave along the cylindrical surface of object 150, between object 150 and layer 160, cutting through adhesive layer 305 adhering layer 160 to object 150 thus remove layer 160. In this manner, layer 160 is removed with minimal damage.

Figure 4A:
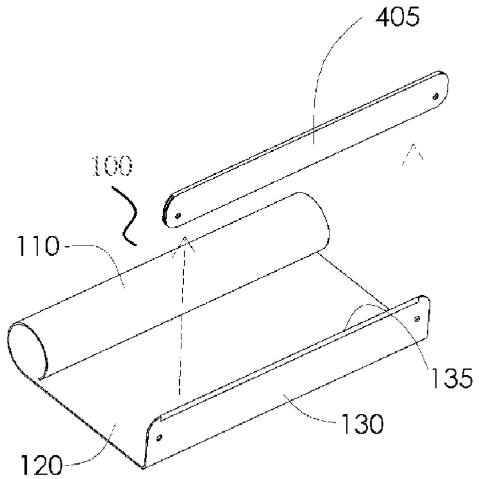
FIG. 4*a-b* are example embodiments of a blade guard for a device for removing a label along a cylindrical surface of an object.
Figure 4B:
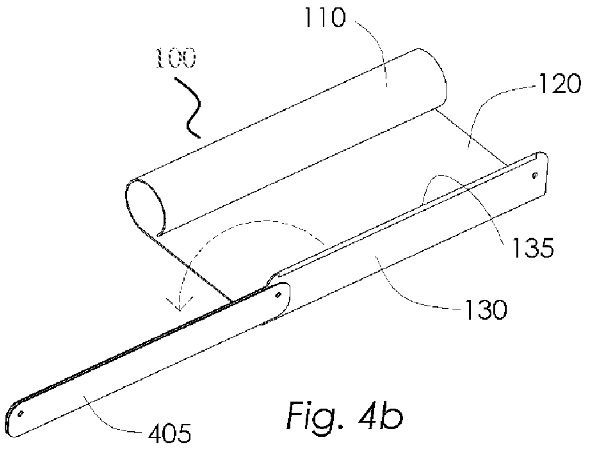

In one embodiment device 100 includes a blade guard 405 as shown in FIG. 4*a-b* to reduce the chance of injury to an operator or handler. Blade 135 is covered by blade guard 405 which may be removed or repositioned to expose blade 135. Blade guard 405 is removably attached to blade 135 by releasable fasteners (not shown), and extends along both sides of blade 135 and covers the edge of blade 135. Releasable fasteners may include detents, clips, screws, wingnuts, press fits, or other suitable mechanisms used to form releasable attachments that would be obvious to one of ordinary skill in the art. Blade guard 405 is removed by unlocking and/or releasing the releasable fasteners and detaching blade guard 405 from blade 135. Blade guard 405 may be completely removable from blade 135 as illustrated by the dashed-arrows to expose blade 135 as shown in FIG. 4*a*. In another embodiment, as shown in FIG. 4*b*, blade guard 405 is securely affixed at a single point on one side of cutting instrument 130. The securely affixed attachment point may include fasteners such as grommets, rivets, or other suitable locking mechanisms used to form a secure attachment that allows rotation that would be obvious to one of ordinary skill in the art. Blade guard 405 may be detached from a releasable fastening point on the opposite side of cutting instrument 130, and be rotated around the axis of the securely affixed attachment point. When the blade guard is rotated (as illustrated by the dashed arrow in FIG. 4*b*), blade 135 is exposed. While FIG. 4*b* illustrates blade guard 405 being rotated in one direction (to the left) it should be appreciated that blade guard 405 could be rotated in the opposite direction. While the above embodiments of blade guard 405 have been described for purposes of illustration and description, it is not intended to be exhaustive or to limit the disclosure to the precise form disclosed, and obviously, many modifications and variations are possible. Such modifications and variations that may be apparent to a person skilled in the art are intended to be included within the scope of this description.

Figure 5A:
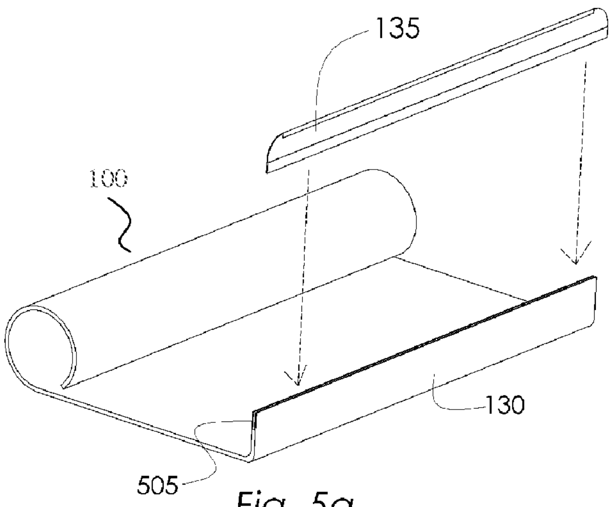
FIG. 5*a-b* are example embodiments of a replaceable blade for a device for removing a label along a cylindrical surface of an object.
Figure 5B:
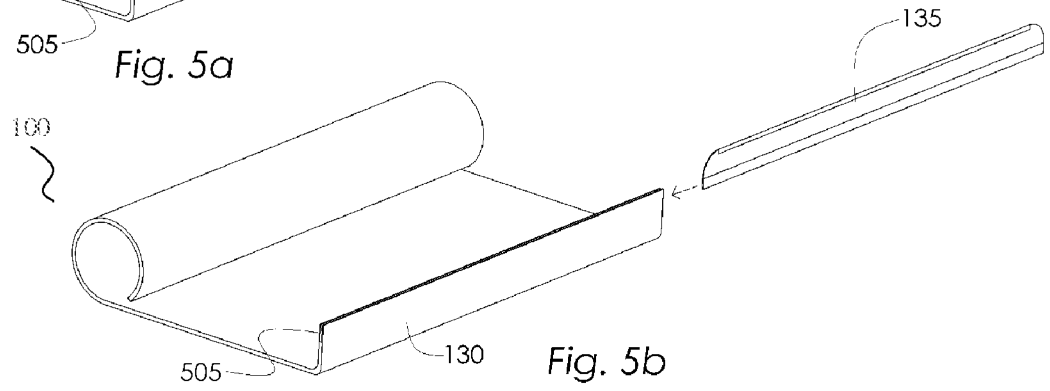

In another embodiment blade 135 of device 100 is replaceable, as shown in FIG. 5*a-b*. FIGS. 5*a* and *b* illustrate two embodiment mechanisms by which blade 135 is removably attached to device 100, thus allowing the removal and replacement of blade 135. FIG. 5*a* illustrates an embodiment where blade 135 is removable/replaceable. Blade 135 is attached to cutting instrument 130 by pressing blade 135 into a blade attachment slot 505 in cutting instrument 130 of device 100, thereby securing the blade into an operating position. Blade 135 may be removed for replacement by pulling blade 135 from blade attachment slot 505. FIG. 5*b* illustrates an embodiment where blade 135 slides into blade attachment slot 505 in cutting instrument 130 of device 100, from the side of cutting instrument 130. Blade attachment slot 505 may be configured in one embodiment so that blade 135 will slide into blade attachment slot 505 from one side only and will be stopped from further sliding when the forward side of blade 135 reaches the further end of blade attachment slot 505, thus ensuring proper positioning of blade 135. A locking mechanism (not shown) may keep blade 135 from sliding once blade 135 is properly position and may be released when the user desires to change blade 135. Locking mechanism may be any conventional locking mechanism that would be obvious to one of ordinary skill in the art. While the above embodiments of a replaceable blade 135 have been described for purposes of illustration and description, it is not intended to be exhaustive or to limit the disclosure to the precise form disclosed, and obviously, many modifications and variations are possible. Such modifications and variations that may be apparent to a person skilled in the art are intended to be included within the scope of this description.

Figure 6A:
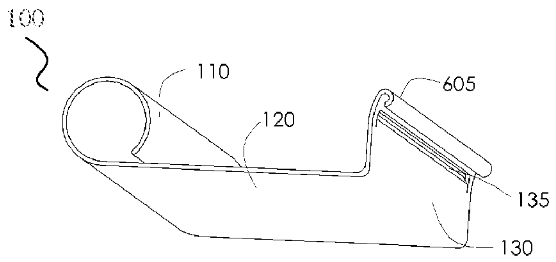
FIG. 6*a-c* are example embodiments of a safety guard for a device for removing a label along a cylindrical surface of an object.
Figure 6B:
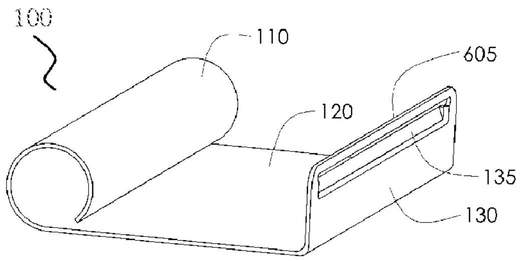
Figure 6C:
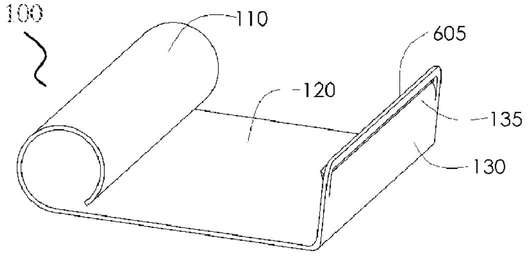

FIG. 6*a-c* illustrate another embodiment of device 100 where cutting instrument 130 further includes a safety guard 605 that is positioned to prevent a user's hand(s) from contacting the edge of blade 135 while still leaving the edge of blade 135 exposed. Safety guard 605 is a non-flexible fender attached to blade 135 adjacent to and above the edge of blade 135, and positioned and shaped so that it does not interfere with the rotation of object 150 when it is forced against blade 135 of cutting instrument 130 and guide 110 of device 100. FIG. 6*a-c* show alternative embodiments for safety guard 605. While the above embodiments of safety guard 605 have been described for purposes of illustration and description, it is not intended to be exhaustive or to limit the disclosure to the precise form disclosed, and obviously, many modifications and variations are possible. Such modifications and variations that may be apparent to a person skilled in the art are intended to be included within the scope of this description.

Figure 7:
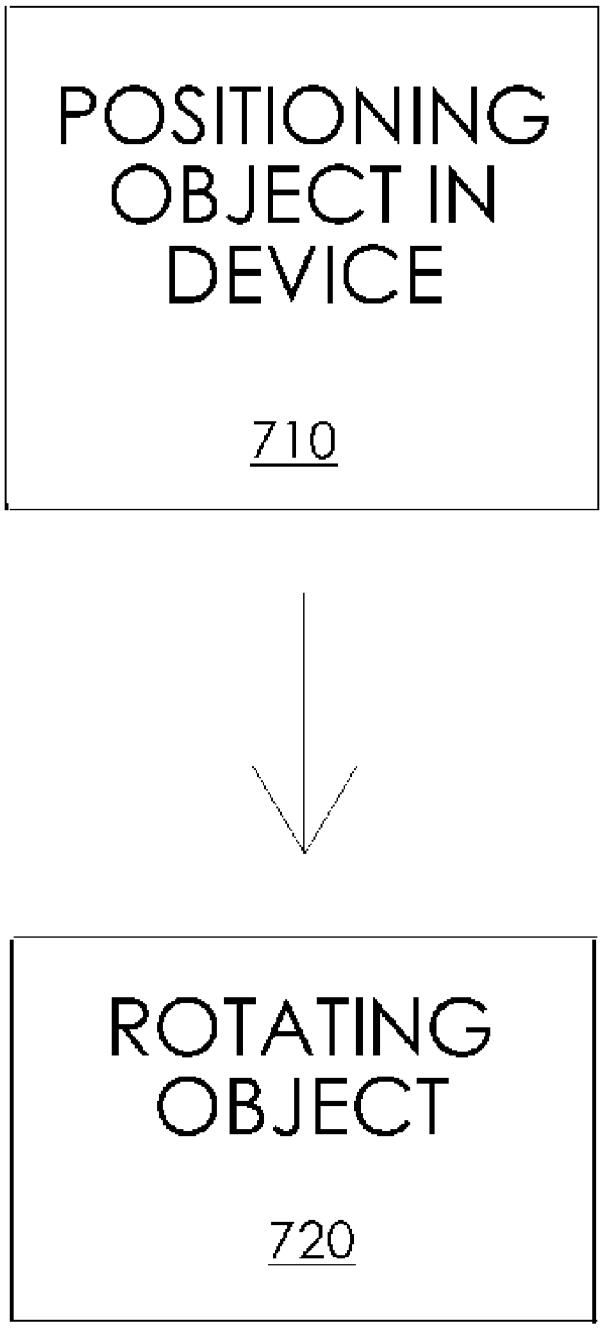
FIG. 7 shows a flow diagram of a method of removing a label along a cylindrical surface of an object using a device for removing a label along a cylindrical surface of an object.

FIG. 7 illustrates a method 700 of removing a layer along a substantially cylindrical surface of an object. The method includes the steps of:

Step 710 positioning an object in a device having a cutting instrument and a guide, wherein the cutting instrument and the guide both support the object, wherein the cutting instrument is positioned to shave along the surface to remove the layer when the object is rotated.

In Step 710 a user positions object 150 on guide 110 and cutting instrument 130 of device 100, so that the cylindrical surface of object 150 is positioned between, and supported by, guide 110 and cutting instrument 130. The user positions layer 160 in alignment with blade 135. The user then causes a downward force to be applied to object 150. The downward force pushes object 150 against guide 110 so that object 150 is forced against guide 110 and cutting instrument 130. The downward force further causes guide 110 to act as a spring form, and cutting instrument 130 to flex so that blade 135 is spring loaded against the cylindrical surface of object 150.

Step 720 rotating the object so the cutting instrument shaves under the layer to remove the layer.

In Step 720 a user causes object 150 to be rotated about its axis while applying a downward force. The edge of blade 135 shaves along the substantially cylindrical surface of object 150 while guide 110 acts as a guide and a spring form to spring load object 150 against blade 130 thus causing layer 160 to be removed as object 150 is rotated.

Prior to step 720 a user may first heat and/or wet layer 160 and/or heating blade 135, to facilitate easier removal. Heating and/or wetting of layer 160 and/or heating blade 135 can be accomplished by any suitable means that would be obvious to one of ordinary skill in the art. Such heating and/or wetting of layer 160 may include, for example, applying warm water directly to layer 160, placing object 150 with layer 160 still attached in a warm water bath, placing object 150 with layer 160 still attached in a microwave other heating device. Heating blade 135 may include, for example, applying heat directly to blade 135 using a heating source such as a lighter, match, integrated heating element, etc. In such an embodiment cutting instrument 130 may include a heat sink to prevent the other portions of device 100, besides blade 135, from excessive heating.

The foregoing description of various aspects of the disclosure has been presented for purposes of illustration and description. It is not intended to be exhaustive or to limit the disclosure to the precise form disclosed, and obviously, many modifications and variations are possible. Such modifications and variations that may be apparent to a person skilled in the art are intended to be included within the scope of the disclosure as defined by the accompanying claims.

What is claimed is:

1. A device for removing a layer along a cylindrical surface of an object, comprising:

a. a guide b. a cutting instrument, wherein the cutting instrument comprises a blade;

c. a base connecting the guide and the cutting instrument; and d. a blade guard removably attached to the blade, where the guide, base, and cutting instrument comprise a unitary structure and where the guide forms the distal portion of the device and the cutting instrument forms the proximate portion of the device and are separated by a flat section of the device that forms the base; and e. wherein, upon insertion of an object between the guide and cutting instrument of the device, the cutting instrument is configured to shave along the object's surface to remove the layer in a non-destructive manner when the surface of the object is rotated against the cutting instrument and against the guide.

2. A device as recited in claim 1, wherein the guide is cylindrical in shape.

3. A device as recited in claim 1, wherein the guide is a spring form, wherein the spring form provides spring action when in contact with the cylindrical surface when the object is rotated with respect to the cutting instrument.

4. A device as recited in claim 1, wherein the cutting instrument extends vertically from the base, in perpendicular orientation to the base.

5. A device as recited in claim 1, wherein the layer comprises a label affixed to an exterior surface of the object.

6. A device for removing a layer along a cylindrical surface of an object, comprising:

a. a guide b. a cutting instrument, wherein the cutting instrument comprises a removable blade; and c. a base connecting the guide and the cutting instrument, where the guide, base, and cutting instrument comprise a unitary structure and where the guide forms the distal portion of the device and the cutting instrument forms the proximate portion of the device and are separated by a flat section of the device that forms the base; and d. wherein, upon insertion of an object between the guide and cutting instrument of the device, the cutting instrument is configured to shave along the object's surface to remove the layer in a non-destructive manner when the surface of the object is rotated against the cutting instrument and against the guide.

7. A device for removing a layer along a cylindrical surface of an object, comprising:

a. a guide b. a cutting instrument, wherein the cutting instrument comprises a blade;

c. a base connecting the guide and the cutting instrument; and d. a safety guard, wherein the safety guard is formed as a portion of the cutting instrument and positioned above the blade, where the guide, base, and cutting instrument comprise a unitary structure and where the guide forms the distal portion of the device and the cutting instrument forms the proximate portion of the device and are separated by a flat section of the device that forms the base; and e. wherein, upon insertion of an object between the guide and cutting instrument of the device, the cutting instrument is configured to shave along the object's surface to remove the layer in a non-destructive manner when the surface of the object is rotated against the cutting instrument and against the guide.

8. A device for shaving along a surface of an object having a cylindrical surface and a layer, comprising a cutting instrument, wherein the cutting instrument comprises a blade; a guide; a blade guard removably attached to the blade; and a base formed between the guide and the cutting instrument, separating the guide and the cutting instrument, and continuously connecting the guide and the cutting instrument with the base, wherein the object is received by the cutting instrument, inserted against the base and the guide such that shaving is along the surface of the object when the object is rotated with respect to the cutting instrument to remove the layer in a non-destructive manner, and wherein the guide, base, and cutting instrument comprise a unitary structure.

9. A device as recited in claim 8, wherein the guide is cylindrical in shape.

10. A device as recited in claim 8, wherein the guide is a spring form, wherein the spring form provides spring action against the cylindrical surface when the object is rotated with respect to the cutting instrument.

11. A device as recited in claim 8, wherein the cutting instrument extends vertically from the base, in perpendicular orientation to the base.

12. A device as recited in claim 8, wherein the guide and the cutting instrument are parallel to one another and extend from the base in a continuous construction, where the guide extends from the distal end of the base and the cutting instrument extends from the proximal end of the base.

13. A device as recited in claim 8, wherein the layer comprises a label affixed to an exterior surface of the object.

14. A device for shaving along a surface of an object having a cylindrical surface and a layer, comprising a cutting instrument wherein the cutting instrument comprises a removable blade; a guide; and a base formed between the guide and the cutting instrument, separating the guide and the cutting instrument, and continuously connecting the guide and the cutting instrument with the base, wherein the object is received by the cutting instrument, inserted against the base and the guide such that shaving is along the surface of the object when the object is rotated with respect to the cutting instrument to remove the layer in a non-destructive style, and wherein the guide, base, and cutting instrument comprise a unitary structure.

15. A device for shaving along a surface of an object having a cylindrical surface and a layer, comprising a cutting instrument wherein the cutting instrument comprises a blade; a guide; a safety guard, wherein the safety guard is positioned adjacent to and above the blade, such that it does not interfere with the rotation of the object about the blade; and a base formed between the guide and the cutting instrument, separating the guide and the cutting instrument, and continuously connecting the guide and the cutting instrument with the base, wherein the object is received by the cutting instrument, inserted against the base and the guide such that shaving is along the surface of the object when the object is rotated with respect to the cutting instrument to remove the layer in a non-destructive manner, and wherein the guide, base, and cutting instrument comprise a unitary structure.

* * * * *